(12) United States Patent
Baraban et al.

(10) Patent No.: US 10,177,451 B1
(45) Date of Patent: Jan. 8, 2019

(54) WIDEBAND ADAPTIVE BEAMFORMING METHODS AND SYSTEMS

(71) Applicant: Ball Aerospace & Technologies Corp., Boulder, CO (US)

(72) Inventors: Mara S. Baraban, Denver, CO (US); Jacob A. Sauer, Arvada, CO (US); Mark Curtis Leifer, Boulder, CO (US); Stanton B. McMillan, Louisville, CO (US)

(73) Assignee: BALL AEROSPACE & TECHNOLOGIES CORP., Boulder, CO (US)

( * ) Notice: Subject to any disclaimer, the term of this patent is extended or adjusted under 35 U.S.C. 154(b) by 497 days.

(21) Appl. No.: 14/864,386

(22) Filed: Sep. 24, 2015

Related U.S. Application Data

(63) Continuation of application No. 14/836,676, filed on Aug. 26, 2015, now abandoned.

(60) Provisional application No. 62/042,103, filed on Aug. 26, 2014.

(51) Int. Cl.
| | | |
|---|---|---|
| *G01S 3/28* | (2006.01) | |
| *H01Q 3/26* | (2006.01) | |
| *H01Q 1/38* | (2006.01) | |
| *G01S 7/28* | (2006.01) | |
| *G01S 19/21* | (2010.01) | |

(52) U.S. Cl.
CPC .......... *H01Q 3/2611* (2013.01); *G01S 7/2813* (2013.01); *H01Q 1/38* (2013.01); *G01S 19/21* (2013.01); *H01Q 3/2605* (2013.01)

(58) Field of Classification Search
CPC ...... H01Q 3/2611; H01Q 3/2605; H01Q 1/38; G01S 7/2813; G01S 19/21
USPC .................................. 342/379, 372, 357.59
See application file for complete search history.

(56) References Cited

U.S. PATENT DOCUMENTS

| | | | |
|---|---|---|---|
| 3,681,772 A | | 8/1972 | Ingerson |
| 4,243,993 A | * | 1/1981 | Lamberty ............ H01Q 11/083 343/895 |
| 4,525,716 A | | 6/1985 | Carlin |
| 4,626,859 A | | 12/1986 | Stansfield |
| (Continued) | | | |

OTHER PUBLICATIONS

Al-Ka'bi et al., "Mitigation of multipath propagation with the use of a non-uniform spaced adaptive array antenna", 2005 IEEE Antennas and Propagation Society International Symposium, 2005, vol. 2B, pp. 56-59.

(Continued)

*Primary Examiner* — Chuong P Nguyen
(74) *Attorney, Agent, or Firm* — Sheridan Ross P.C.

(57) ABSTRACT

Wide band adaptive beam forming methods and systems are provided. The beam forming methods can include receiving signals at multiple antenna elements and digitizing samples of the received signals for some period of time. The samples are divided into sub-channels according to frequency, and interferers are identified as signals appearing across at least some minimum number of the sub-channels. After removing signals not identified as interferers from the collected signal information, that information is used to calculate weights for forming a beam having a null at the identified location of the interferer. The beam forming systems include multiple element antennas having arms in the form of a spiral, and processing hardware for performing adaptive beam forming.

30 Claims, 11 Drawing Sheets

(56) References Cited

U.S. PATENT DOCUMENTS

| | | | | |
|---|---|---|---|---|
| 4,630,064 | A | * | 12/1986 | Andrews ............... H01Q 25/02 343/895 |
| 4,639,733 | A | | 1/1987 | King et al. |
| 4,658,262 | A | * | 4/1987 | DuHamel .............. H01Q 11/10 343/792.5 |
| 5,162,806 | A | | 11/1992 | Monser |
| 5,313,216 | A | * | 5/1994 | Wang ...................... H01Q 9/27 343/700 MS |
| 5,327,143 | A | * | 7/1994 | Goetz ...................... G01S 3/14 342/158 |
| 5,532,700 | A | | 7/1996 | Lockwood |
| 5,541,608 | A | | 7/1996 | Murphy et al. |
| 5,771,439 | A | | 6/1998 | Kennedy, Jr. et al. |
| 5,777,579 | A | | 7/1998 | Goetz et al. |
| 5,940,026 | A | * | 8/1999 | Popeck ................. G01S 5/0247 342/357.36 |
| 6,023,250 | A | * | 2/2000 | Cronyn ................... H01Q 1/36 343/895 |
| 6,127,974 | A | | 10/2000 | Kesler |
| 6,130,652 | A | | 10/2000 | Goetz et al. |
| 6,459,895 | B1 | | 10/2002 | Hastings et al. |
| 6,882,312 | B1 | | 4/2005 | Vorobiev et al. |
| 6,885,338 | B2 | | 4/2005 | Gaus, Jr. et al. |
| 7,880,675 | B1 | | 2/2011 | Paschen et al. |
| 8,305,265 | B2 | * | 11/2012 | Ezal ..................... G01C 21/005 342/357.36 |
| 8,334,808 | B2 | | 12/2012 | Remez et al. |
| 8,354,961 | B2 | | 1/2013 | Kawasaki |
| 9,065,176 | B2 | * | 6/2015 | Wang ................... H01Q 11/105 |
| 9,312,602 | B2 | * | 4/2016 | Gregoire ................ H01Q 9/30 |
| 2002/0147031 | A1 | | 10/2002 | Hood, III |
| 2004/0039984 | A1 | | 2/2004 | Burkert et al. |
| 2004/0196172 | A1 | | 10/2004 | Wasiewicz |
| 2006/0012521 | A1 | | 1/2006 | Small |
| 2007/0274375 | A1 | | 11/2007 | Ray et al. |
| 2010/0007555 | A1 | * | 1/2010 | Ezal ..................... G01C 21/005 342/357.3 |
| 2016/0142119 | A1 | * | 5/2016 | van Houtum ........ H04B 1/1036 375/260 |

OTHER PUBLICATIONS

Amin et al., "A Novel Interference Suppression Scheme for Global Navigation Satellite Systems Using Antenna Array", IEEE Journal on Selected Areas in Communications, vol. 23, No. 5, May 2005, pp. 999-1012.

Capon, "High-Resolution Frequency-Wavenumber Spectrum Analysis," Proceedings of the IEEE, 1969, vol. 57, No. 8, pp. 1408-1418.

Orban et al., "The Basics of Patch Antennas," 2005, 9 pages.

Schmidt, "Multiple Emitter Location and Signal Parameter Estimation," IEEE Transactions on Antennas and Propagation, 1986, vol. AP-34, No. 3, pp. 276-280.

Schmidt et al., "Multiple Source DF Signal Processing: An Experimental System," IEEE Transactions on Antennas and Propagation, 1986, vol. AP-34, No. 3, pp. 281-290.

Yoo et al., "Multipath Mitigation Technique Using Null-Steering Beamformer for Positioning System", The 57th IEEE Semiannual Vehicular Technology Conference, 2003, vol. 1, pp. 602-605.

Official Action for U.S. Appl. No. 13/961,745, dated Apr. 4, 2016 19 pages.

Notice of Abandonment for U.S. Appl. No. 13/961,745, dated Oct. 18, 2016 2 pages.

* cited by examiner

WIDEBAND ADAPTIVE BEAMFORMING METHODS AND SYSTEMS

CROSS-REFERENCE TO RELATED APPLICATIONS

The present application is a continuation of U.S. patent application Ser. No. 14/836,676, filed Aug. 26, 2015, which claims the benefit of U.S. Provisional Patent Application Ser. No. 62/042,103, filed Aug. 26, 2014, the entire disclosures of which are hereby incorporated herein by reference.

FIELD

Wideband adaptive beamforming methods and systems are provided.

BACKGROUND

Radio-based communications systems are increasingly used to transmit important information. In order to ensure the reliability of such transmissions, and to prevent the public or unauthorized distribution of proprietary or confidential information, various techniques have been developed. For example, frequency hopping, spread spectrum, encryption, and other transmission and encoding technologies can be used. Although such techniques can be effective at increasing the reliability and security of radio transmissions, improved reliability, data rates, and range continue to be sought after.

In any radio communication system, the signal-to-noise ratio is an important consideration. The strength of the received signal can be affected by various factors, such as the transmission range, antenna gain, filter efficiency, environmental conditions, encoding techniques, transmission strength, and the like. Noise can originate from natural sources, intentional interference, and unintended interference.

Various techniques can be employed in order to increase the signal strength of a desired signal or to reduce the effect of noise on a desired signal. For example, the transmission power of the signal can be increased, coding techniques can be improved, data rates can be reduced, signal processing can be improved, antenna gain can be increased, or antennas capable of forming beams directed towards a desired signal or conversely capable of placing a null in a direction corresponding to a source of noise can be used. However, the ability of such techniques to improve the signal to noise ratio of a desired signal is limited. For example, available transmission power can be constrained by the ability of a transmitter to access a suitable power supply. Security considerations associated with data encoding can place limits on the efficiency of such encoding. Reductions in data rates can be impractical or undesirable. Improvements to the gain of an antenna can be limited by size and other physical antenna constraints.

Manipulating the shape of an antenna beam can be an effective way to improve the signal-to-noise ratio. However, doing so has required identifying the relative location of a noise source or sources, and accurately modifying the beam shape to exclude the noise source or sources. This can be difficult to accomplish across a broad frequency range as such beam steering techniques have required large amounts of processing power.

SUMMARY

In accordance with embodiments of the present disclosure, wideband adaptive beamforming methods and systems are provided. In general, the disclosed methods and systems allow for the efficient creation and pointing of nulls in an antenna beam, in order to reduce the effect of interference sources, also referred to herein as interferers, on a desired signal. Moreover, such methods and systems are operable even while maintaining an ability to receive desired signals transmitted over frequencies within a wide frequency range. In addition, such methods and systems can provide improved performance while requiring reduced processing capabilities.

Systems in accordance with embodiments of the present disclosure can include an antenna having wideband, omnidirectional characteristics. In accordance with embodiments of the present disclosure, the antenna may include a multiple element antenna. Moreover, the antenna can provide a consistent phase response across a wide range of frequencies. In accordance with embodiments of the present disclosure, the antenna performs like a monopole that provides broadband performance. Accordingly, the antenna can include a plurality of monopoles. As an example, but without limitation, the antenna can include 8 monopoles. Although an antenna with multiple monopole elements can provide appropriate antenna response characteristics, such a design is, by its nature, inappropriate for applications in which a conformal antenna mount is desired. Accordingly, other embodiments of the present disclosure can include an antenna having a plurality of substantially planar elements. In at least some embodiments, the antenna elements all have the same shape and size, and are disposed within a common plane, and extend from adjacent a center point towards an outer circumference of the antenna. The antenna elements can each be associated with a feed point. The feed point for each antenna element can be located adjacent the center point. Alternatively, the feed point for each antenna element can be adjacent the outer circumference of the antenna. In accordance with further embodiments, the antenna elements can have a spiral type format, in which the angle of each portion of each element changes with distance from the center point. Moreover, the width of each element can increase with distance from the center point. This configuration can provide an omnidirectional, or at least hemispherical, beam pattern over a wide range of frequencies, and is well suited to use in conformal applications. In addition, this configuration can provide a relatively consistent phase response between pairs of antenna elements over a range of frequencies.

Each antenna element can be associated with a receive channel. The receive channel can include a radio frequency front end that operates to retrieve the received signals. The received signals are then grouped by frequency into a number of sub-channels or frequency bins. Signals that are present within some minimum number of frequency bins, and that have some minimum amplitude, are identified as interferers. Weights or modifications to the received signals are calculated to place nulls in the beam pattern in the direction of the identified interferers. The weights are then applied to the signals in the respective sub-channels, and the modified sub-channels are recombined and provided as a radio frequency signal to a receiver or radio.

In accordance with at least some embodiments of the present disclosure, nulls are not directed at signals present in the sub-channels that are not identified as interferers. In particular, the eigenvalues of those signals are adjusted to at or below the level of the noise floor before the weights are calculated. This has the effect of maintaining the desired antenna response, particularly in areas of the beam pattern outside of the nulls.

In an exemplary embodiment, but without limitation, the signals received at each antenna element are down converted to an intermediate frequency or to baseband. Such down conversion can be performed using superheterodyne and/or quadrature down conversion techniques. The signals received by the elements of the antenna are then provided to analog to digital converters, and digitized signals from each of the antenna elements are collected over some period of time. The collected signals are then sorted according to frequency. For example, a number of sub-channels or ranges of frequencies within the full bandwidth are defined.

In accordance with at least some embodiments of the present disclosure, a covariance matrix for the collected time samples within each of the different sub-channels is calculated. An Eigen decomposition is then performed on each covariance matrix. Eigenvalues greater than a threshold are maintained for evaluation as potential interferers. The dot product between potential interference vectors is then calculated. Eigenvectors associated with interferers are identified by finding dot products from different sub-channels that are close to one. For each sub-channel, the eigenvalues that have not been identified as interferers are adjusted to the noise floor. Weights for each sub-channel are then calculated using adjusted eigenvalues with an optimal adaptive beamforming algorithm, to create nulls in the antenna beam in a direction or directions corresponding to interferers. At least some embodiments utilize Capon's method, also called minimum variance distortionless response (MVDR). These weights can then be applied to each sub-channel, the sub-channels recombined, and the recombined signal up-converted to a radio frequency signal. As a result of the applied weights, nulls are placed in locations corresponding to identified interferers or interference sources, thereby improving the signal to noise ratio with respect to a desired signal or signals.

In accordance with other embodiments, steering vectors to each incoming signal of at least a minimum strength are determined from the signals that have been sorted into the different frequency bins. For example, the Multiple Signal Classification (MUSIC) algorithm can be used to determine steering vectors and received power levels for the signals in each sub channel or band. Interference signals can then be identified by taking dot products between the steering vectors in the different sub-channels. MVDR or other methods can then be used to create weights to form nulls that exclude or that alternate signals from the identified interferers. These weights can then be applied to the sub-channels, and the sub-channels can be recombined and provided to the radio as in other embodiments.

Additional features and advantages of embodiments of the present disclosure will become more readily apparent from the following description, particularly when taken together with the accompanying drawings.

DETAILED DESCRIPTION

Figure 1:
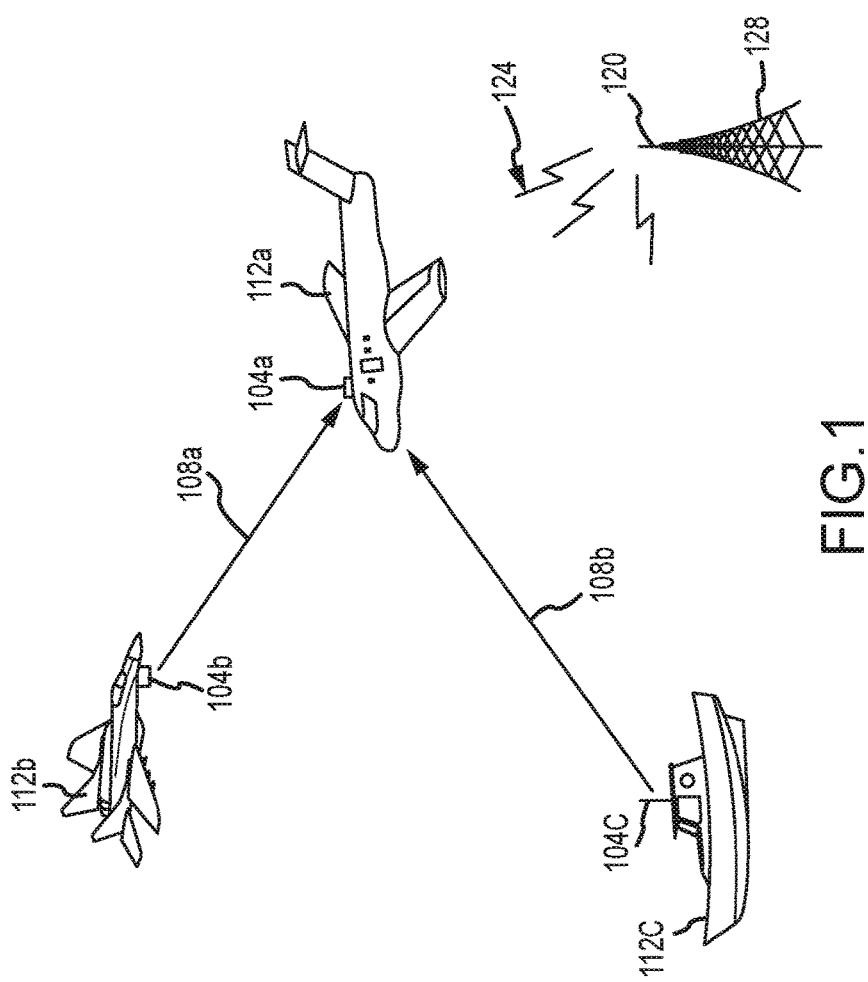
FIG. 1 is a depiction of a scenario in which the signal to noise ratio of desired communication system signals is negatively affected by a source of interference.

FIG. 1 depicts an exemplary scenario in which the receipt of desired signals is subject to interference from an interferer. More particularly, in FIG. 1, a first communication system 104a is receiving, or attempting to receive, transmitted signals 108a and 108b from second or third communication systems 104b and 104c respectively. In this example, the first communication system 104a is associated with a first platform 112a, in this case an aircraft, the second communication system 104b is associated with a second platform 112b, in this case a second aircraft, and the third communication system 104c is associated with a third platform 112c, in this case a surface ship. Moreover, the different platforms 112a-112c may be affiliated or allied with one another, such that the various communication systems 104 are compatible with one another. Although the communication systems 104 are shown as being associated with mobile platforms 112 of various types, it should be appreciated that stationary and/or other types of platforms 112 may be associated with communication systems 104 in accordance with embodiments of the present disclosure. Moreover, although the first communication system 104a is depicted as a receiving communication system 104, and the second 104b and third 104c communication systems are depicted as transmitting systems, communication systems 104 can be provided that both transmit and receive signals. Alternatively, a particular platform 112 can be associated with a communication system 104 that both transmits and receives, a communication system 104 that only receives, or a communication system 104 that that only transmits.

An interferer 120 can include any source of electromagnetic energy 124 that interferes with the reception of a desired communication signal 108. Accordingly, an interferer 120 can include an intentionally transmitted source of electromagnetic energy 124, or a natural source of electromagnetic energy 124. Moreover, multiple interference sources 120 can be present in a given scenario. In the example scenario of FIG. 1, the interferer 120 is shown as being associated with a stationary platform 128, such as a radio tower. However, it should be appreciated that an interferer 120 can be associated with different types of platforms, and can be mobile or stationary. Moreover, the interferer 120 can be associated with an entity that intends to disrupt the transmission of desired signals 108 between the affiliated platforms 112. However, embodiments of the present disclosure have application in other scenarios, such as where an interferer or interference source 120 is associated with an unintentional or non-hostile emission of radio frequency energy.

In accordance with embodiments of the present disclosure, the transmitted signals 108 can be associated with one or a number of frequencies. For example, a communication system 104 can use a frequency hopping technique, in which different segments or portions of a transmission or signal are transmitted at different frequencies during different periods of time. In addition, the electromagnetic energy 124 produced by an interferer can occupy a wide range of frequencies simultaneously.

Figure 2:
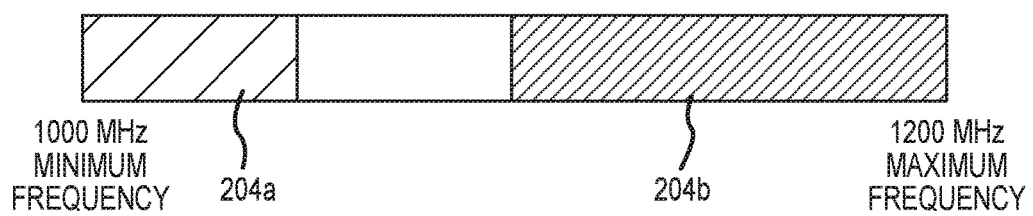
FIG. 2 depicts frequency bands used in an exemplary frequency hopping communication system.

FIG. 2 depicts an exemplary arrangement for such a frequency hopping communication system 104. Within an overall system bandwidth extending from a minimum frequency (e.g., 1000 MHz) to a maximum frequency (e.g., 1200 MHz), a number of different frequency ranges 204 can be established. These frequency ranges 204 can have different widths. For example, a first frequency range 204a can extend from 1000 MHz to 1050 MHz, and a second frequency range 204b can extend from 1100 MHz to 1200 MHz. Accordingly, the different frequency ranges 204 need not be contiguous to one another. Within each of the frequency ranges 204, specific frequencies can be valid for transmission by the communication system 104. Moreover, the number of valid frequencies within each frequency range 204 can be different. For example, within the first frequency range 204a, x frequencies or channels can be valid, where x is equal to 20, and within the second range of frequencies 204b, y frequencies can be valid, where y is equal to 30. The signal 108 transmitted by a particular communication system 104 hops among the available or valid channels such that the signal is present in only one channel at a time. As an example, the transmitted signal 108 can hop between frequencies at a rate of from 50,000-100,000 hops per second.

Significant interference with a communication system 104 that uses multiple frequencies can occur when an interferer 120 simultaneously emits or transmits signals 124 on all or most of the different channels (i.e., across most or all of the valid frequencies) utilized by the communication system 104. Moreover, the deleterious effect of the interference tends to increase with the power of the signals 124. Specifically, the introduction of noise from an interferer 120 decreases the performance of the affiliated communication systems 104 by decreasing the signal to noise ratio of the desired signals 108. In order to restore the ability of the communication systems 104 to communicate with one another, the transmission power of a transmitting communication system 104 can be increased, the coding utilized by the communication systems 104 can be improved, the data rates utilized by the communication systems 104 can be decreased, and/or signal processing can be improved. As another technique, adaptive nulling, where a null within an antenna pattern is placed in a direction of an interferer 120, can be employed. Embodiments of the present disclosure are directed to employing adaptive nulling in order to maintain an acceptable signal to noise ratio for communications between affiliated communication systems 104. Moreover, the adaptive nulling systems and techniques described herein can provide improved performance, can do so with fewer resources, and/or can be implemented more efficiently than previous systems.

Figure 3:
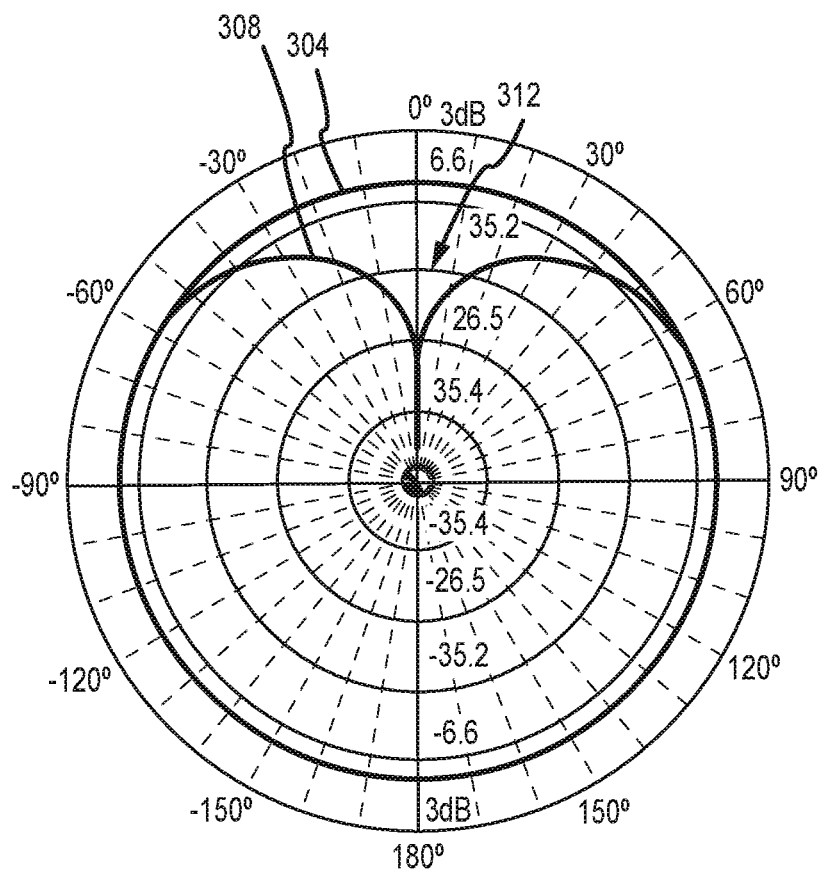
FIG. 3 depicts an antenna response for an exemplary antenna in accordance with embodiments of the present disclosure.

FIG. 3 depicts an example antenna response for an antenna included within a receiving communication system 104 in accordance with embodiments of the present disclosure. In particular, the antenna can feature an omnidirectional pattern. In an omnidirectional type pattern, the sensitivity of the antenna to a signal in any direction relative to the antenna is the same or about the same, as depicted by plot 304. As can be appreciated by one of skill in the art after consideration of the present disclosure, in an ideal system an omnidirectional pattern may be spherical about the location of the antenna. Alternatively, an antenna may have a response or beam pattern that is omnidirectional within some other volume, such as a hemispherical volume or a toroidal volume. Moreover, for example in connection with a frequency hopping communication system, the antenna can provide the same or similar beam patterns across the effective range of frequencies. Accordingly, the beam pattern 304 depicted in FIG. 3 represents the response of an exemplary antenna for a first frequency at different angles in azimuth with respect to the antenna. In accordance with still other embodiments, the beam pattern 304 of the antenna can be directional or otherwise non-omnidirectional.

The second plot 308 depicts the response of the example antenna after modification using adaptive nulling to create a null 312 in the antenna pattern. As can be appreciated by one of skill in the art, a null 312 is an area of decreased sensitivity within an antenna pattern. By matching the location of a null 312 to the location of an interferer 120, the signal to noise ratio of signals transmitted from locations at angles relative to the antenna that they do not fall into the null 312 can be preserved. Accordingly, the signal to noise ratio of desired signals 108 in the presence of an interferer 120 can be improved by using a modified pattern 308.

Figure 4:
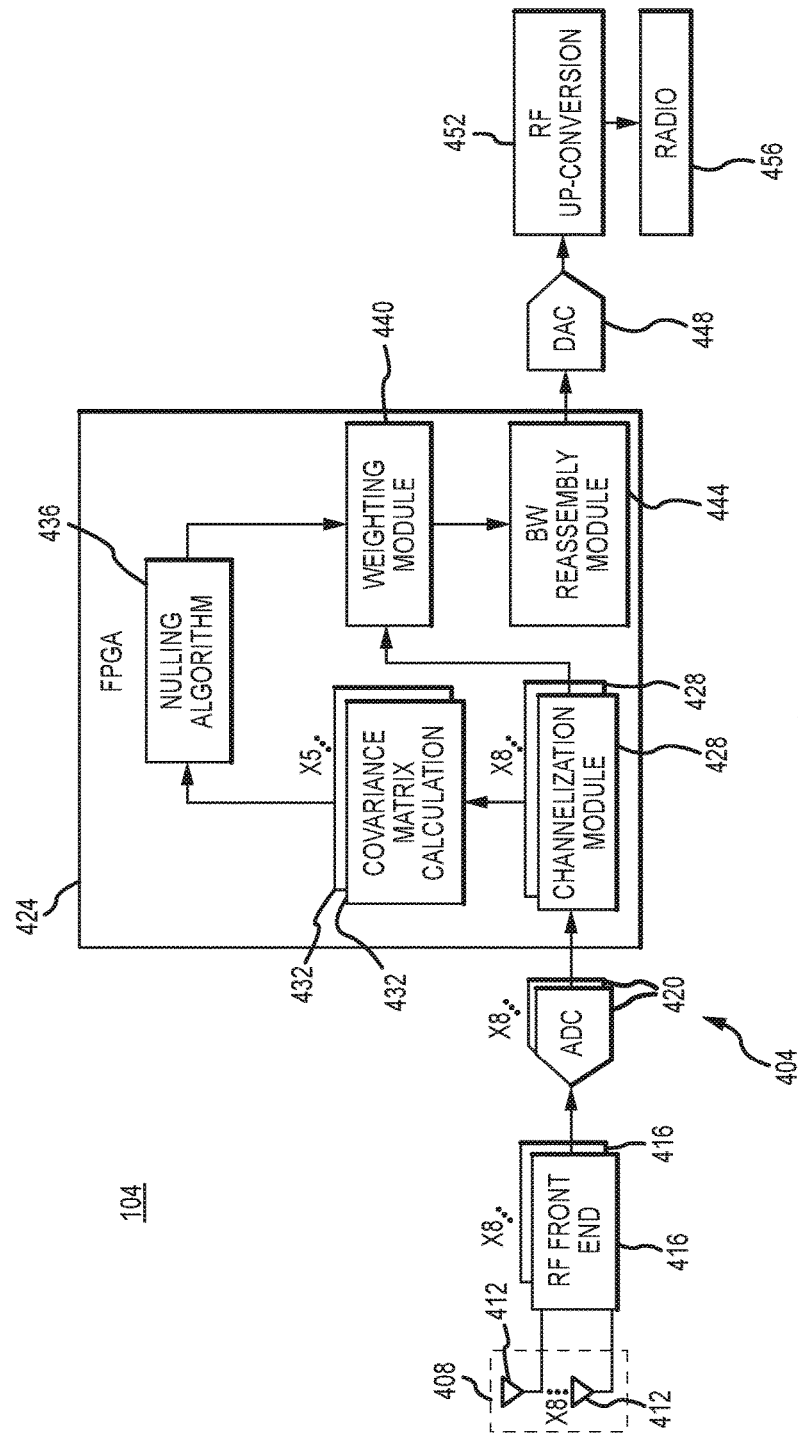
FIG. 4 is a block diagram depicting components of a communication system incorporating an antenna system in accordance with embodiments of the present disclosure.
Figure 10:
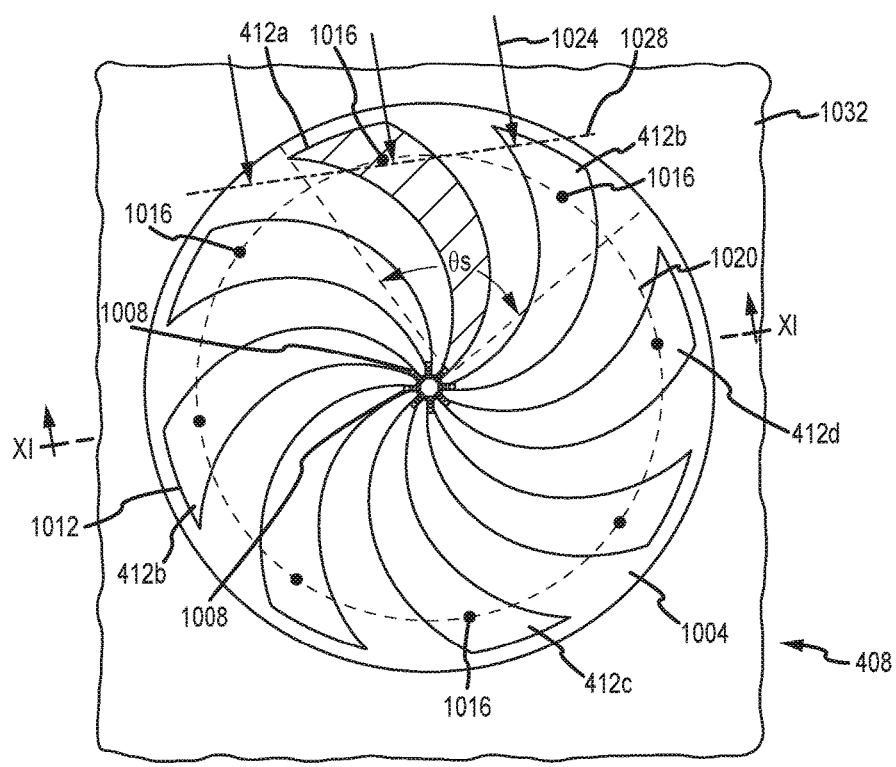
FIG. 10 depicts an antenna in accordance with embodiments of the present disclosure in plan view.

FIG. 4 depicts a communication system 104, incorporating an antenna system 404 in accordance with embodiments of the present disclosure. In general, the communication system 104 includes an antenna 408 that is operable to receive electromagnetic energy, also referred to herein as radio waves or signals. In accordance with embodiments of the present disclosure, the antenna 408 can include multiple antenna elements or arms 412. The number of antenna elements 412 determines the number of nulls that can be created in the antenna beam pattern. In particular, n−1 nulls can be created, where n is equal to the number of antenna elements 412 in the antenna 408. As an example, but without limitation, the antenna 408 can include eight antenna elements 412. As discussed elsewhere herein, the antenna 408 can comprise a conformal antenna. Moreover, the antenna elements 412 can each be in the form of a partial spiral. In accordance with other embodiments, the antenna 408 can include a plurality of monopoles, or a plurality of dipoles, in a circular arrangement. In accordance with still other embodiments, any antenna 408 in which the phase differences between pairs of the antenna elements 412 remain substantially constant as a function of frequency can be used by the antenna system 404. As an example, the antenna of FIG. 10 is designed to have phase differences that remain essentially constant as a function of frequency. As another example, phase differences between antenna elements that on average change less than 10° per 100 MHz in any given direction and generally do not exceed a change of 40° per 100 MHz can be considered substantially constant.

Signals received by the antenna 408 are provided to a radio frequency (RF) front end 416. Where the antenna 408 includes multiple elements 412, an RF front end 416 can be provided for each of the antenna elements 412. As can be appreciated by one of skill in the art after consideration of the present disclosure, the RF front ends 416 can include an amplifier. In addition, the RF front ends 416 can each include an oscillator that operates to convert received signals to an intermediate frequency. In accordance with at least some embodiments of the present disclosure, the RF front ends 416 comprise quadrature down converters, which split the received signals into an in phase channel (the I channel) and a quadrature channel (the Q channel), and converts the channels directly to baseband. The result is the received signals at baseband, without the undesired image signal version of those signals. The converted signals can then be provided to an analog to digital converter (ADC) 420. When multiple RF front ends 416 are included, each RF front end 416 can be associated with an ADC 420. The ADC 420 samples the received signals at a selected sampling rate to obtain a complex number representing an amplitude (voltage) and a phase of the signal at the time the sample is taken. As an example, but without limitation, the sampling rate can be 100 MHz. Moreover, where the RF front ends 416 include a quadrature down converter, the ADCs 420 can each include I and Q channels to recover the received signals. In accordance with other embodiments, the RF front ends do not include oscillators, in which case the received radio frequency signals are provided to ADCs 420 that perform direct RF to digital sampling. In another embodiment, signals are digitized at the intermediate frequency and are digitally down converted in quadrature. In yet another embodiment, signals are digitized directly at RF, followed by digital down conversion to an intermediate frequency and final digital down conversion in quadrature. One skilled in the art can appreciate that additional methods, or variations of the methods described herein, can be used to produce digitized in-phase and quadrature signals from the RF signals appearing at the antenna element ports.

The now digitized signals are then provided to a processor 424. In accordance with embodiments of the present disclosure, the processor 424 may comprise a field programmable gate array (FPGA), controller, application specific integrated circuit (ASIC), or general purpose processor. Moreover, the processor 424 can be programmed to perform various functions, discussed elsewhere herein, through software, firmware, dedicated logic circuits, or a combination thereof. Initially, the digitized signals can be provided to a channelization module 428 implemented by the processor. A different channelization module 428 can be provided for each antenna element 412. Accordingly, where the antenna 408 includes 8 elements 412, 8 channelization modules 428 can be provided. Each channelization module 428 generally operates to collect the digitized signal information for some period of time. For example, but without limitation, each channelization module can collect samples for 40 μsec, corresponding to 4,000 samples when the sampling rate is 100 MHz. Each of the samples can be in the form of a complex number, representing a magnitude and phase of the signal.

Figure 6:
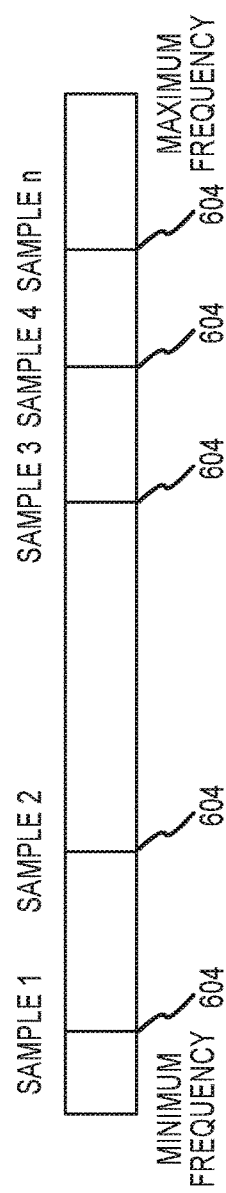
FIG. 6 depicts a sampling process in accordance with embodiments of the present disclosure.
Figure 7:
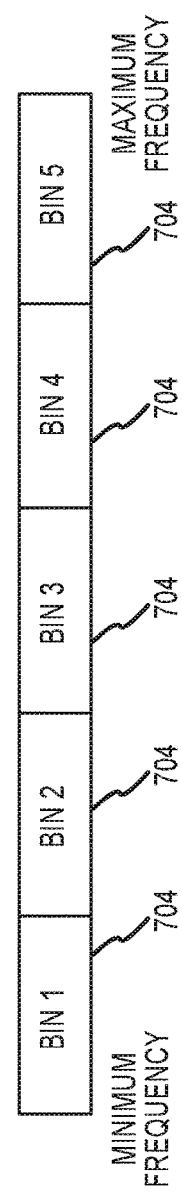
FIG. 7 depicts frequency bins in accordance with embodiments of the present disclosure.

In accordance with embodiments of the present disclosure, the channelization modules 428 then divide or sort the samples from each of the antenna elements 412 into different frequency bins or sub-channels. In general, and as discussed in greater detail elsewhere herein, the different frequency bins can be selected to cover some or all of a range of frequencies utilized by the communication system. As can be appreciated by one of skill in the art after consideration of the present disclosure, the number of frequency bins affects the accuracy with which nulls can be produced and placed. In particular, by using a relatively large number of bins, the depth of the nulls can be increased. However, a large number of bins requires additional calculations and increases the load on the processor 424. As depicted in FIG. 6, the frequency bins 604 can be discrete frequencies selected from within the full bandwidth of the communication system 104. Alternatively, the frequency bins 704 can each cover a range of frequencies, and those ranges of frequencies can combine to cover the entire effective bandwidth of the communication system 104, as shown in FIG. 7. As yet another alternative, the frequency bins can each cover a range of frequencies, with gaps in coverage between some or all of the ranges of frequencies. Accordingly, the frequency bins 704 can together cover all or most of the full bandwidth of the communication system 104. Alternatively, gaps in coverage, for example in non-operative ranges of the bandwidth, can be present. As an example, but without limitation, the antenna system 404 can use five frequency bins 604 or 704. In accordance with still other embodiments, the antenna system 404 uses five frequency bins 704 that each cover a range of frequencies.

As can be appreciated by one of skill in the art after consideration of the present disclosure, the sorting of samples according to frequency can be performed using a Fourier Transform, polyphase channelization, or other technique. For instance, a Fourier Transform can be performed to obtain the frequency content of the samples. The samples are then filtered or sorted into the different frequency bins 604 or 704 according to their determined frequency content. A covariance matrix is then calculated for each of the frequency bins or sub-channels 604 or 704. For example, where 5 frequency bins or sub-channels 604 or 704 are utilized, 5 covariance matrices are created. In particular, the collected time samples, grouped into sub-channels, can be provided to covariance matrix modules 432, which calculate the covariance matrix for a respective sub-channel 604 or 704 from the collected time samples for that sub-channel 604 or 704.

The processor 424 then operates to identify those signals that are present across multiple frequency sub-channels or bins 604 or 704 as interfering signals or interferers 124, as discussed in greater detail elsewhere herein. The nulling algorithm 436, also implemented in the processor 424, calculates weights for each of the frequency bins 604 or 704. These weights can be used to create destructive interference in the antenna beam in the direction corresponding to the source of the interfering signals 124, thus creating a null 312 in the antenna beam pattern at that identified location. Moreover, the nulling algorithm 436 substantially maintains the desired antenna beam pattern in areas of the beam pattern that do not encompass an interferer 120. The nulling algorithm 436 provides its output to a weighting module 440. The weighting module 440 also receives the samples, divided by sub-channel 604 or 704, from the channelization modules 428. The weighting module 440 applies the weights received from the nulling algorithm 436 to the samples for each sub-channel 604 or 704 provided by the channelization modules 428. In some embodiments, the weighted module 440 receives samples that are channelized differently than the covariance matrix calculation 432. For instance, the weights each can be calculated from a discrete frequency 604 while the weighting module receives samples over a range of frequencies 704. In this situation, the weights, calculated with respect to a single frequency within a channel 604, are applied to the full bin bandwidth for the channel 704 encompassing the single frequency within the corresponding channel 604. The weighted sub-channel information is then provided to the bandwidth reassembly module 444, where the sub-channels 604 or 704 are recombined, creating a weighted antenna response. Reassembly can include an inversion of the channelization of the signals into sub-channels 604 or 704. For example, an inverse Fourier transform can be performed on each sub-channel 604 or 704. The weighted antenna response is then provided to a digital to analog converter (DAC) 448 where the weighted antenna response is converted to an analog signal. The analog signal is then up-converted to a radio frequency signal in a radio frequency up conversion block 452. The up-converted, weighted signal is then provided to the radio 456. Alternatively, where processing has taken place at radio frequencies, the weighted signal is provided to the radio 456 without any up conversion. One skilled in the art may envision other methods to convert the digital weighted signals to RF.

Figure 5A:
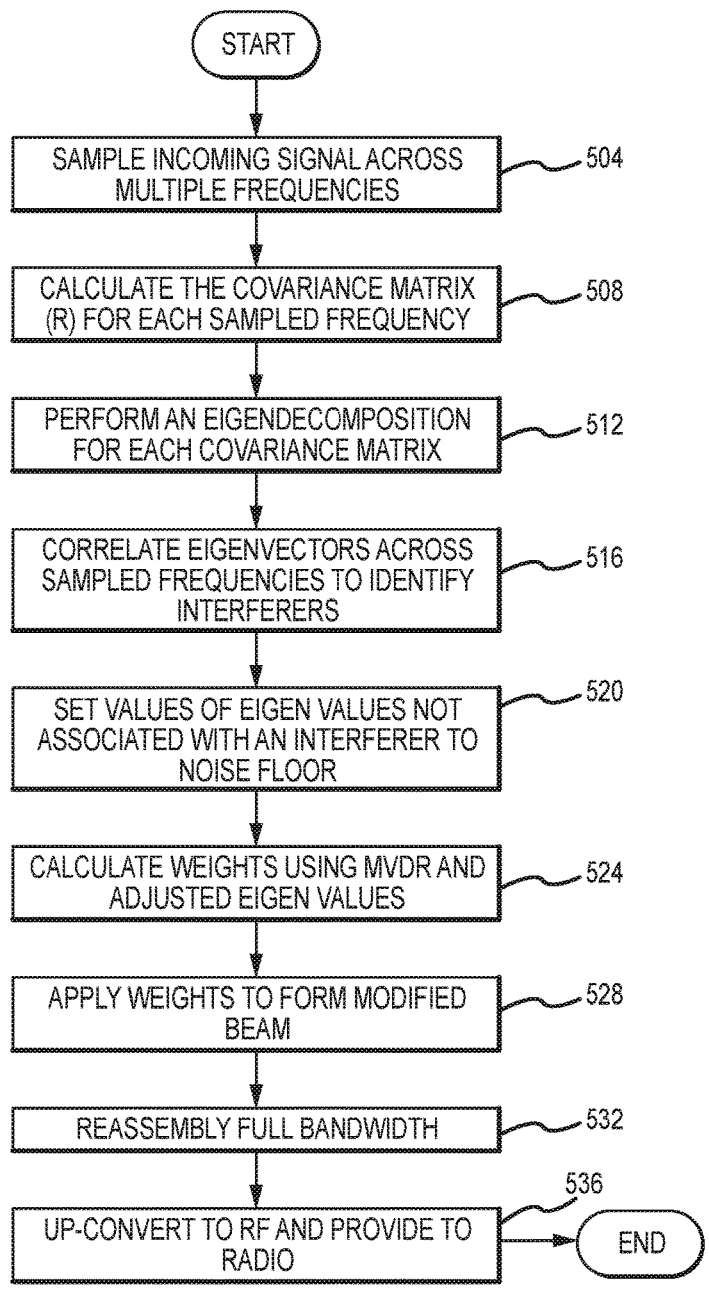
FIG. 5A is a flowchart depicting a process for producing nulls in an antenna beam in accordance with embodiments of the present disclosure.

Additional aspects of a method for adaptive beam forming in accordance with embodiments of the present disclosure are depicted in and described in connection with FIG. 5A. Initially, at step 504, an incoming signal is sampled across multiple frequencies. In particular, the response of the antenna 408 over the full bandwidth of the communication system 104 is measured and digitized. This measurement and digitization can be performed for each element 412 of the antenna 408. The process of measuring and digitizing the signals received at the antenna element 412 can be performed by the RF front ends 416 and ADCs 420.

The full bandwidth can then be broken up into sub-channels or frequency bins 604 or 704, and the covariance matrix (R) for each sub-channel can be calculated (step 508). In general, the greater the number of sub-channels 604 or 704 the greater the precision with which nulls in the antenna response pattern can be placed relative to any interferers 120. For an implementation that uses frequency bins 704 covering a range of frequencies, each of the sub-channels 704 can be of different widths, and together can cover all or a portion of the frequency ranges within the full bandwidth used for transmitting desired signals 108. For example, the full bandwidth may be divided into 5 sub-channels 704 that each cover from 15-50 MHz, and that in total cover 75-250 MHz of the full bandwidth. Alternatively, each of the frequency bins 704 can have the same width. As can be appreciated by one of skill in the art after consideration of the present disclosure, the covariance matrix for each sub-channel 604 or 704 enables signals within the respective frequency range to be characterized with respect to strength and location in antenna space. The step of sorting the signals sampled from the antenna elements 412 into different sub-channels 604 or 704 can include transforming the sampled signals from the time domain to the frequency domain, and can be performed by channelization modules 428 in the processor 424, while covariance matrix calculation modules 432 can calculate the covariance matrix for each sub-channel 604 or 704.

At step 512, an Eigen decomposition is performed for each covariance matrix ($R=U^H \Lambda U$, where R is a covariance matrix, $\Lambda$ is a diagonal matrix containing the eigenvalues of R, U is a unitary matrix containing the eigenvectors of R, and H denotes the Hermitian conjugate). Accordingly, in an exemplary system where 5 frequency bins or sub-channels are defined, an Eigen decomposition for each of the 5 covariance matrices is performed. The decomposition of the covariance matrices can be performed by the nulling algorithm 436.

At step 516, eigenvectors contained in the matrix U obtained by the Eigen decomposition are correlated across the sampled frequency bins to identify interferers 120. Optionally, only those eigenvectors possessing eigenvalues greater than a threshold are maintained for purposes of this correlation, while those less than the threshold are not included in this calculation. This can reduce the processing required in order to create a null in a desired location, because only relatively strong signals, which would include signals from any interferers 120, are included in the subsequent calculation. However, such thresholding of the eigenvalues may not be appropriate in all scenarios. Where thresholding of the eigenvalues is performed, an exemplary threshold value is 24 dB above the noise floor. Eigenvector correlation includes calculating dot products between potential interference eigenvectors in different sub-channels. Dot products that are close to 1 identify spatial correlation. Moreover, signal sources that are spatially correlated across different frequencies can be taken as an indication of an interferer 120, because desired signals 108 are, for a given time period, transmitted at a specific frequency or a narrow frequency range. As an example, but without limitation, a dot product of greater than 0.9 across four or more sub-channels 604 or 704 can be considered to be associated with an interferer 120. The correlation of eigenvectors can be performed by the nulling algorithm 436.

Figures 8, 9:
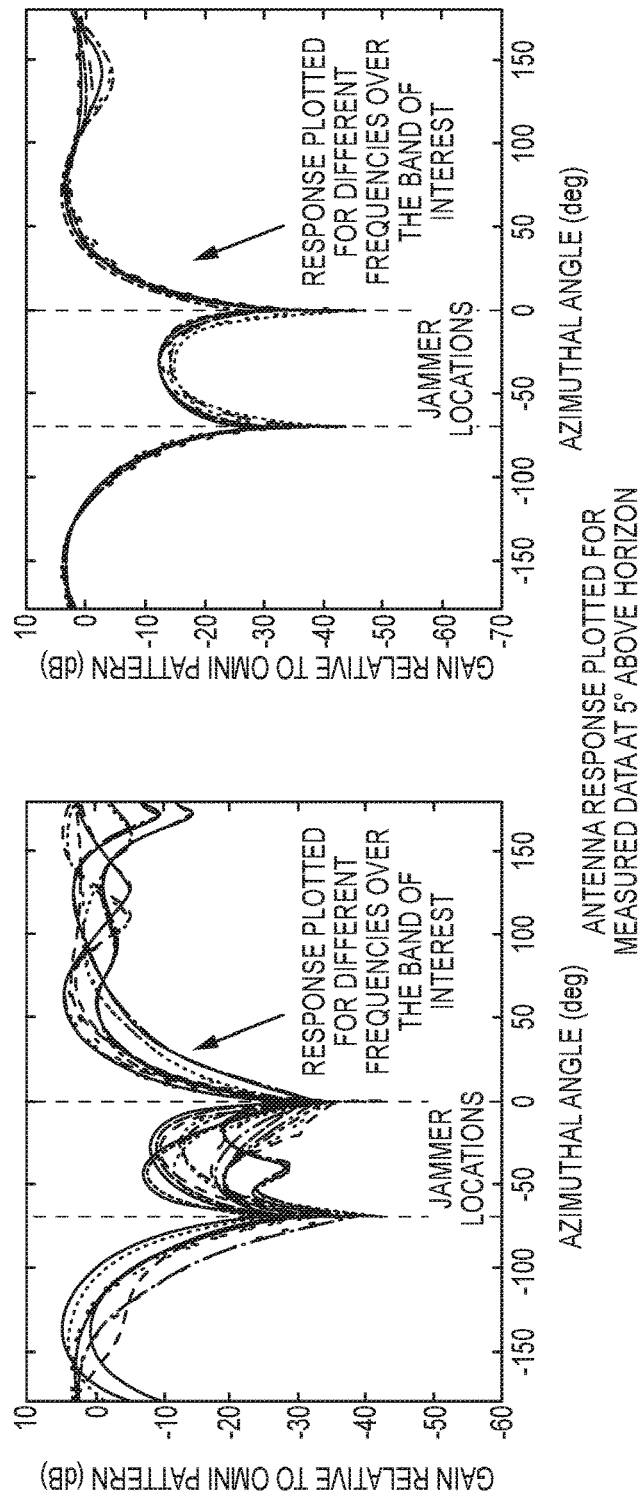
FIG. 8 depicts an exemplary antenna response with nulls applied in response to all signals received at the antenna.
FIG. 9 shows the antenna response for the example antenna of FIG. 8, with nulls determined after signals identified as non-interfering signals have been removed.

The values of eigenvalues that are not associated with interferers 120 are then set to or below the noise floor (step 520). This is done for the non-interference eigenvalues in each of the eigenvalue matrices ($\Lambda$) that were obtained for the frequency bins 604 or 704. As can be appreciated by one of skill in the art after consideration of the present disclosure, adjusting the value of eigenvalues that are not interferers to the noise floor removes those signals that are likely desired signals 108 from the calculation of weights used to generate destructive interference to create nulls in the direction of the interferers 120. In particular, by setting non-interferer eigenvalues to the noise floor, unwanted distortion of the modified antenna beam pattern is avoided. This effect is illustrated in FIGS. 8 and 9. In particular, FIG. 8 depicts the antenna response for an antenna system 104 using weights that were calculated without adjusting non-interferer signals to the noise floor. FIG. 9 illustrates the beam pattern for the antenna 408 under the same conditions depicted in FIG. 8, except that the applied weights were calculated after non-interferer eigenvalues have been set to the noise floor. Comparing the antenna response plots for FIGS. 8 and 9, it is apparent that, when the non-interferer eigenvalues are not set to the noise floor, the antenna pattern is distorted in areas outside of the nulled directions. In particular, the inclusion of eigenvalues that are not interferers in the calculation results in decreased antenna response for at least some frequencies within the full bandwidth of the antenna system 104.

A weight vector or weight for each sub-channel 604 or 704 is then calculated (step 524). For example, the weights can be calculated using MVDR with adjusted Eigen values. In particular, the weights are complex numbers that are calculated as follows:

$$w = \frac{U\Lambda^{-1}U^H v}{a}$$

where U is the unitary matrix of eigenvectors obtained from the Eigen decomposition of the covariance matrices, H denotes the Hermitian conjugate, $\Lambda$ is the diagonal matrix of adjusted eigenvalues, v is the steering vector specifying the desired antenna beam pattern (here an omnidirectional pattern), and a is a scale factor chosen to appropriately normalize the weight vector. As examples, and without limitation, possible normalization values can include a=1, $a = v^H U \Lambda^{-1} U^H v$, or a equal to some other normalization term selected to maintain desired pattern characteristics.

The weights can be applied by the weighting module 440 to each sub-channel 604 or 704 (step 528). Applying the weights can include receiving the original channelized samples of information from the received signals, as created in the channelization module 428, and modifying each channel of sample values by multiplying them by the weight vector calculated for the channel.

The full spectrum of the received bandwidth is then reassembled, and provided to a digital to analog converter 448 (step 532). The reassembly can be performed by the reassembly module 444, and can include an inverse transform, for example using an inverse Fourier Transform, from the frequency domain to the time domain, of each sub-channel. The separate time domain signals can then be added together, before or after conversion of the time domain version of the signals to an analog signal. The reassembled full bandwidth, with the weights for nulling applied, can then be up-converted back to a radio frequency, for example in the RF up-conversion module 452, and from there sent to the communication system 104 radio 456 (step 536).

Figure 5B:
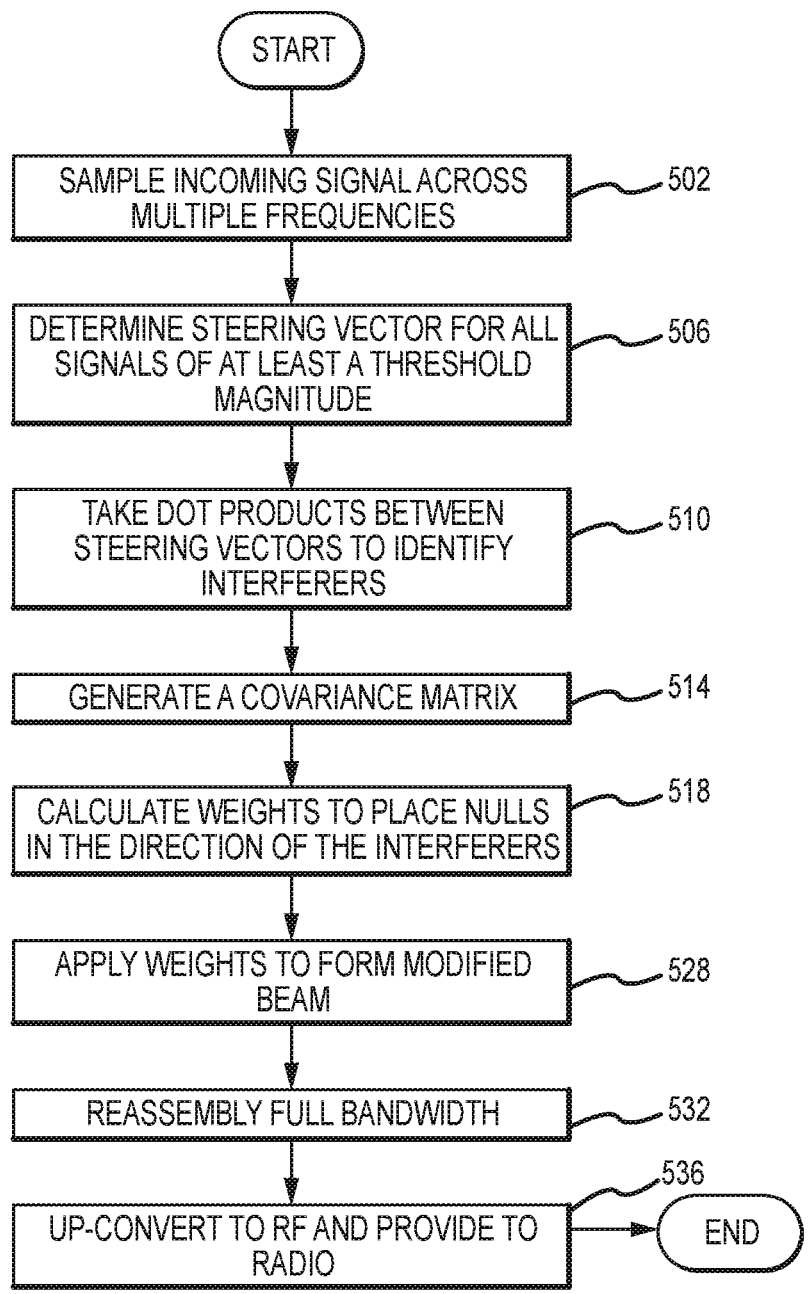
FIG. 5B is a flowchart depicting another process for producing nulls in an antenna beam in accordance with embodiments of the present disclosure.

Alternatively, as illustrated in FIG. 5B, other techniques for calculating the weights that can be applied to the signal to create a null in the direction of an interferer, while maintaining the desired pattern in other directions, can be used. Examples of such other techniques include the use of direction finding algorithms, such as MUSIC, or MVDR used in a direction finding mode. As with other techniques described herein, the signal received at the antenna elements 412 is sampled and digitized (step 502). Next, a steering vector and power level for each incoming signal is determined (step 506). This step can be performed using MUSIC or MVDR in a direction finding mode. As an example, applying the MUSIC algorithm can include finding the eigenvalues in each sub-channel 604 or 704. Eigenvalues corresponding to thermal noise can be identified by their small size, and their associated eigenvectors define a noise sub-space. All interferers and signals have eigenvectors normal to the noise sub-space; these eigenvectors define a signal subspace. The identified signal subspace is then searched by fitting plane waves at every angle of arrival to the data. A match indicates the presence of an interferer 124 or a signal 108 from the direction along the associated angle of arrival. In some applications, antenna elements are sensitive to polarization and the interferers are arbitrary in polarization. In these cases, a modified search that incorporates polarization, as described in publications discussing MUSIC, can be performed. As a result, a steering vector corresponding to a unique angle of arrival will be determined for each interferer 124 and signal 108. Notably, the steering vectors provided using these techniques are more exact, but computationally more intensive, than using an Eigen decomposition. Dot products between steering vectors corresponding to signals having a received power equal to or greater than a selected threshold amount can then be taken to separate interferers 124 from signals 108, based on sub-channel 604 or 704 occupancy (step 510). The identified interference steering vectors can be used to generate a covariance matrix (step 514). The covariance matrix is then used by the nulling algorithm to compute weights to place nulls in the direction of the interferers (step 518). This action is performed by MVDR in a preferred embodiment. The process can then proceed through the application of calculated weights (step 528), the reassembly of the full bandwidth (step 532), and up conversion (if necessary) (step 536) as described in connection with other embodiments discussed herein.

In at least some embodiments, the communication system 104 components between the antenna 108 and through the digital to analog converter 448 can be provided as an integrated antenna system 404. For example, the processor 424, the analog to digital converters 420, the digital to analog converter 448, and the radio frequency front end 416 components can be provided as circuitry that is co-located with the antenna 408. More particularly, the integrated antenna system 404 can be provided as a unitary component that can take the place of a conventional antenna element, physically and functionally, and that can also provide anti-interferer 120 capabilities, without requiring modifications to other systems or components on the platform 112. The processed, analog signal can be provided to a radio frequency conversion module 452, and then provided to the communication system 104 radio 456. In accordance with embodiments of the present disclosure, the radio 456 can comprise a conventional communication system radio that performs signal reception operations, for example in connection with a frequency hopping communication system, without requiring an awareness of or integration with the antenna system 404. Accordingly, embodiments of an antenna system 404 as disclosed herein can be added to existing communication systems, without requiring modifications to such systems, enabling existing systems to benefit from the enhanced performance and in particular the enhanced anti-interferer 120 capabilities that can be provided by embodiments of the present disclosure. Moreover, embodiments of the present disclosure provide nulling solutions that can be added to an existing communication system, without requiring any feedback or control input from that communication system. In accordance with still other embodiments of the present disclosure, components or functions of the antenna system 404 can be distributed. Moreover, at least some functions can be performed by processors or other hardware provided as part of other components or systems associated with the platform.

Figure 11:
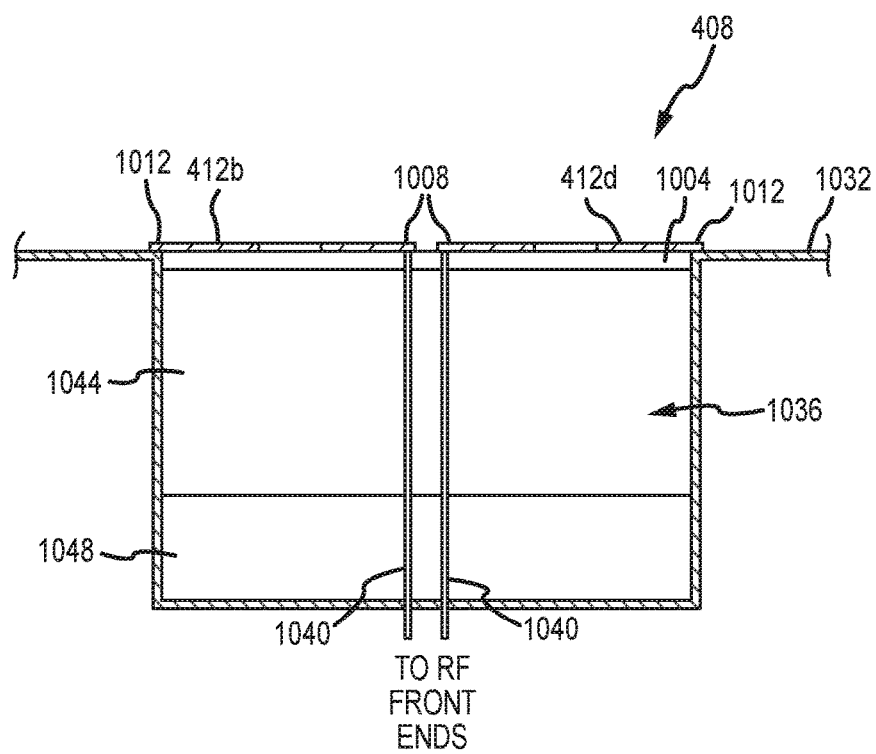
FIG. 11 depicts the antenna of FIG. 10 in a cross-section taken in elevation.

FIG. 10 depicts an antenna 408 in accordance with at least some embodiments of the present disclosure in plan view. FIG. 11 depicts the antenna 408 of FIG. 10 in a cross-section taken in elevation along section line XI-XI. As shown, the antenna 408 can include multiple elements or arms 412 disposed on a planar substrate 1004 within a circular area. In this example, 8 elements 412 are depicted. However, other numbers of elements 412 can be utilized. Each element 412 extends from a feed point 1008 located near a center of the circular antenna 408. Moreover, each element 412 forms a partial spiral. In addition, the width of the arm increases along the length of the element 412 from the feed point 1008 towards an outer end 1012 of the element 412. As can be appreciated by one of skill in the art after consideration of the present disclosure, signals of different wavelengths are received at different locations along the length of the spiral. More particularly, the location along the elements 412 at which a signal of a particular wavelength is received will generally coincide to a location where the wavelength of the received signal is about equal to the circumference of the antenna at that location. In accordance with at least some embodiments, the elements or arms 412 increase in width logarithmically with distance from the feed point 1008. In addition, the elements 412 are spaced equally. The sweep of the elements 412 can be defined by a sweep angle $\theta_s$. As examples, the sweep angle $\theta_s$ can have a range of from 0° to 360°, from greater than 0° to 360°, from 1° to 100°, from 80° to 100°, or from 80° to 90°. As a particular example, but without limitation, the sweep angle can be exactly 88°, or can be about 88°, as in the embodiment depicted in FIG. 10, where about is +/−2 degrees. In the embodiment illustrated in FIG. 10, the area occupied by an element 412 is about equal to the open area between adjacent elements 412.

In FIG. 10, a location 1016 on each antenna element 412 corresponding to the location at which a signal of a particular wavelength is received is depicted. The locations 1016 lie on a circumference 1020 of the antenna 408 that is about equal to the wavelength of the signal. Moreover, for an incoming radio frequency signal 1024 having an associated wave front 1028, it can be appreciated that a time of arrival of the wave front 1028 at each antenna element 412 is different. For instance, when the wave front 1028 of the incoming radio frequency signal 1024 is received at a first antenna element 412a, the signal will not yet have been received by any of the other antenna elements 412. When that wave front 1028 of the incoming signal 1024 is received at a next one of the antenna elements 412b, the phase of the received signal 1024 will be different from the phase of the signal 1024 as it is received at the first antenna element 412a and will be different by still another amount when the wave front 1028 of the incoming radio frequency signal 1024 is received at another antenna element 412c. This is due to difference in the total path length that the radio frequency signal 1024 travels. Accordingly, the phase of the signal will vary according to the angle at which the signal 1024 is received by a particular element 412.

Figure 12:
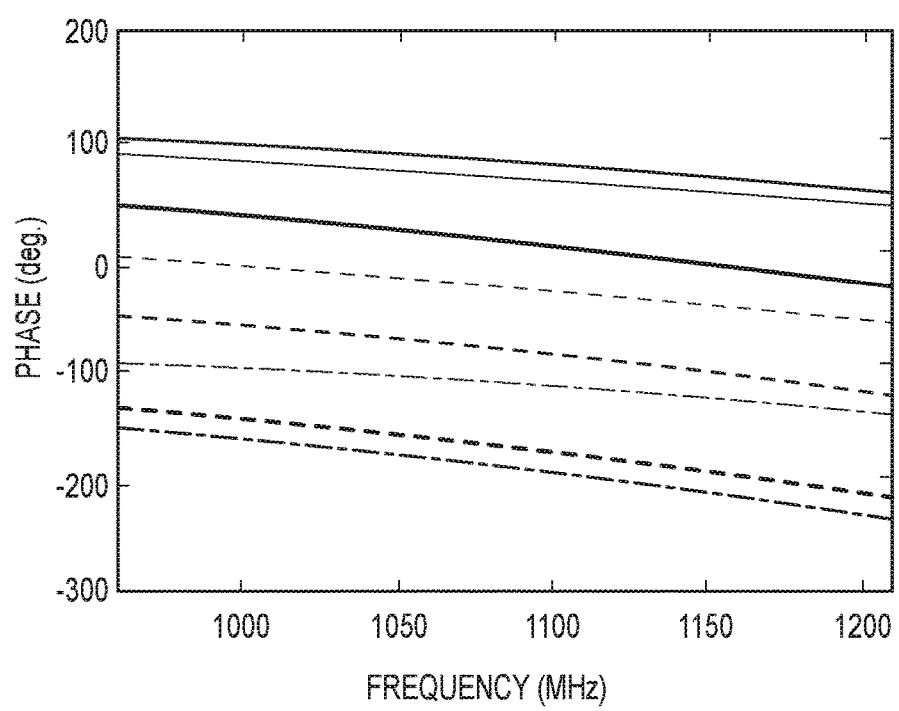
FIG. 12 depicts a phase response of the antenna of FIGS. 10 and 11 for signals received at different frequencies.

In addition, the phase of received signals will vary with respect to frequency. However, as depicted in FIG. 12, this variation can be relatively limited when an antenna of the configuration depicted in FIGS. 10 and 11 is utilized. In particular, FIG. 12 depicts the variations in phase over a range of frequencies for each of the eight elements 412 in an exemplary antenna 408, and shows that an antenna 408 as disclosed herein can provide phase centers that scale nearly linearly with wavelength.

As best shown in FIG. 11, each arm 412 is supported by the substrate 1004. The substrate 1004 can be planar, and the antenna elements 412 can all lie in the same plane. Alternatively, the substrate 1004 can be non-planar, and the antenna elements 412 can be in the same or in different planes. The substrate 1004 is associated with a surrounding ground plane 1032. A cavity 1036 can be formed behind the substrate 1004 on which the antenna elements 412 are mounted. The base and sides of the cavity can be part of the ground plane 1032 that extends around a perimeter of the substrate 1004. Accordingly, the cavity 1036 can be in the form of a closed cylinder. At the feed points 1008, each antenna element 412 is connected to an individual signal line 1040 that connects each element 412 to a respective radio frequency front end 416. The end 1012 of each antenna element 412 opposite the feed point 1008 can be electrically connected to the surrounding ground plane 1032, as shown in FIG. 11, or can be electrically isolated from the ground plane 1032. For example, a gap can be formed between the ends of the antenna elements 412 and the ground plane 1032. The cavity 1036 can comprise an empty volume, or can be filled with material, including but not limited to radio frequency absorbing material. In addition, a frequency selective surface, radome, or other structure can be placed over the antenna 408.

In FIG. 11, the dimensions of the antenna 408 have been exaggerated in a depth direction, to more easily illustrate components such as the antenna elements 412 and the antenna substrate 1004 in cross-section. In an exemplary embodiment, the diameter of the cavity 1036 is about 7.5 inches, while the diameter of the circle defined by the outer edges of the antenna elements 412 is slightly larger than the diameter of the cavity. The depth of the cavity may be about 4 inches. The antenna elements 412 can be formed from an electrically conductive metal or metal alloy, such as but not limited to copper, aluminum, or the like. Similarly, the ground plane 1032 and the cavity 1036, whether integral to the ground plane 1032 or formed separately, can be formed from an electrically conductive metal, or metal alloy, such as but not limited to copper, aluminum, or the like. The substrate 1004 can be formed from a dielectric material. The signal lines 1040 can comprise coaxial cables provided in the form of a feed tree, with the signal lines extending through the cavity 1036, and can connect to an RF front end 416. As an example, a portion of the cavity 1036 immediately adjacent the substrate 1004 can be filled with three inches of unloaded honeycomb material 1044, and the portion of the volume farthest from the substrate 1004 can be occupied by one inch of loaded honeycomb material 1048. Other modifications to the antenna 408 are possible.

In accordance with embodiments of the present disclosure, the ground plane 1032 can form part of an outer surface of a vehicle or other platform 112. Accordingly, it can be appreciated that an antenna 408 as disclosed herein can be configured so that it is conformal when installed in a vehicle or other platform 112. In addition, the antenna 408 can be packaged or otherwise co-located with other components of the antenna system 404. Accordingly, the antenna system 404 can be provided as a package that can be installed in a platform 112, while conforming to the aerodynamic, or other physical features and requirements of the associated platform 112, and can further be "plugged in" to the radio 456 otherwise provided in connection with communication system 104 on a platform 112, without requiring any particular control or other integration other than power. Accordingly, the antenna system 404 can be included as part of a larger communications system 104 on a platform 112, and can provide the enhanced beam forming capabilities described herein, without requiring special modifications to the other components of the communication system 104.

Although an antenna system 404 including an antenna 408, and associated electronics have been described as operating in combination, various sub-combinations of the disclosed antenna system 404 can be employed in connection with a communication system 104. In particular, the electronic and associated beam forming techniques described herein can be utilized in connection with various antenna designs and configurations. For example, the electronics, signal processing and beamforming techniques, or both can be utilized in connection with an antenna having multiple monopoles, an antenna with multiple elements arranged in the form of an Archimedean spiral, sinuous, or log spiral configuration, or various other multiple element antenna configurations. The antenna 408 described herein can also be used in connection with conventional beam forming techniques, rather than with beam forming techniques and supporting electronic components as described herein. In particular, the consistent phase response over a wide range of frequencies provided by embodiments of the antenna 408 described herein can facilitate the provision of nulls in locations corresponding to broadband interferers 120 using conventional beam forming algorithms.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A beam forming system, comprising:
   an antenna, the antenna including a plurality of antenna elements;
   one or more analog to digital converters, wherein each of the antenna elements is connected to an analog to digital converter; and
   a processor, wherein the processor is operable to execute instructions to:
   collect samples of the response of each of the antenna elements from the one or more analog to digital converters for a selected period of time;
   sort the collected samples by frequency, wherein each of the collected samples is assigned to one of a plurality of frequency bins;
   identify a signal present in each of the frequency bins as an interferer;
   adjust any signals present in any frequency bin that is not identified as an interferer to a noise floor;
   for each frequency bin, calculate a weight to place a null in an antenna beam pattern at a location corresponding to an interferer;
   for each frequency bin, apply the calculated weight for a frequency bin to the collected samples associated with that frequency bin to create a weighted signal; and
   generate a beam using the weighted signal, wherein the beam includes a null at the location corresponding to the interferer.

2. The beam forming system of claim 1, further comprising:
   for each frequency bin, generating a covariance matrix for each of the collected samples associated with the frequency bin; and
   performing an Eigen decomposition of each of the covariance matrices to obtain eigenvalues and normalized eigenvectors for each of the covariance matrices.

3. The beam forming system of claim 2, further comprising:
   taking dot products between potential interference eigenvectors, wherein identifying a signal present in each of the frequency bins as an interferer includes identifying those signals in at least a selected number of frequency bins that have a dot product of at least a selected magnitude.

4. The beam forming system of claim 3, wherein the selected number of frequency bins is four, and wherein the selected magnitude is 0.9.

5. The beam forming system of claim 3, further comprising:
   adjusting eigenvalues that have not been associated with interferers to or below a noise floor.

6. The beam forming system of claim 5, wherein the weight vector w for each frequency bin is calculated from the expression $$w = \frac{U\Lambda^{-1}U^H v}{a}$$

where U is the unitary matrix of eigenvectors obtained from the Eigen decomposition of the covariance matrices, H denotes the Hermitian conjugate, $\Lambda$ is the diagonal matrix of adjusted eigenvalues, v is the steering vector specifying the desired antenna beam pattern, and a is a scale factor chosen to appropriately normalize the weight vector.

7. The beam forming system of claim 6, wherein $a = v^H U \Lambda^{-1} U^H v$.

8. The beam forming system of claim 6, wherein the desired pattern is omnidirectional.

9. The beam forming system of claim 1, wherein each of the antenna elements is disposed on a planar substrate and is connected to a signal line at a feed point, and wherein each of the antenna elements is a spiral shaped element that increases in width from a respective feed point to an outer circumference of the antenna.

10. The beam forming system of claim 9, wherein a sweep angle of each of the antenna elements is between 0° and 360°.

11. The beam forming system of claim 9, wherein a sweep angle of each of the antenna elements is about 88°.

12. The beam forming system of claim 10, wherein the antenna includes eight antenna elements.

13. The beam forming system of claim 9, wherein the width of each of the antenna elements increases logarithmically.

14. The beam forming system of claim 9, wherein a sweep angle of each of the antenna elements is between 1° to 100°.

15. The beam forming system of claim 9, wherein a sweep angle of each of the antenna elements is between 80° to 90°.

16. The beam forming system of claim 15, wherein the width of each of the antenna elements increases logarithmically.

17. The beam forming system of claim 16, wherein the antenna possesses circular symmetry.

18. The beam forming system of claim 9, wherein each of the plurality of antenna elements is disposed on a planar substrate.

19. The beam forming system of claim 9, wherein the antenna possesses circular symmetry.

20. The beam forming system of claim 1, further comprising:
    a digital to analog converter, wherein the weighted signal is converted to an analog signal.

21. The beam forming system of claim 1, further comprising a radio, wherein the radio receives the weighted signal.

22. A method for adaptive beamforming, comprising:
    receiving radio waves at a plurality of antenna elements;
    collecting samples of the antenna response to the radio waves at each of the antenna elements for a period of time by a processor;
    sorting the samples from each of the antenna elements into a plurality of different frequency bins by the processor, wherein each different frequency bin contains information regarding radio waves within a different range of frequencies;
    identifying a signal present in multiple ones of the different frequency bins as an interferer by the processor;
    after removing signals not identified as an interferer, calculating a plurality of weights to place a null within an antenna beam at a location corresponding to an interferer by the processor; and applying the weights by the processor to generate a beam having a null in the direction of the interferer.

23. The method of claim 22, further comprising:

digitizing the collected samples, wherein the antenna response for each antenna element is recorded as a complex number representing an amplitude and phase of a received signal at each of a plurality of intervals in time for the period of time.

24. The method of claim 23, wherein sorting the samples from each of the antenna elements into a plurality of different frequency bins includes sorting the digitized collected samples into frequency bins.

25. The method of claim 24, further comprising:

creating a covariance matrix from the information contained for each of the frequency bins.

26. The method of claim 25, further comprising:

performing an Eigen decomposition of the covariance matrices for each of the frequency bins.

27. The method of claim 26, wherein identifying a signal present in multiple ones of the different frequency bins as an interferer includes taking a dot product between potential interference eigenvectors across multiple ones of the different frequency bins, wherein a dot product close to one is taken as an indication that the eigenvectors are associated with an interferer.

28. The method of claim 27, further comprising:

adjusting a value of eigenvalues that are not interferers to the noise floor.

29. The method of claim 28, wherein the weight (w) for each frequency bin is calculated from the expression $$w = \frac{U \Lambda^{-1} U^H v}{a}$$

where U is the matrix of eigenvectors obtained from the Eigen decomposition of the covariance matrices, $\Lambda$ is the adjusted eigenvalues, and v is the desired antenna beam pattern vector.

30. The method of claim 29, wherein the desired antenna beam pattern is omnidirectional.

* * * * *